United States Patent [19]

Tran et al.

[11] Patent Number: 5,903,910

[45] Date of Patent: May 11, 1999

[54] METHOD FOR TRANSFERRING DATA BETWEEN A PAIR OF CACHES CONFIGURED TO BE ACCESSED FROM DIFFERENT STAGES OF AN INSTRUCTION PROCESSING PIPELINE

[75] Inventors: Thang M. Tran; Marty L. Pflum; David B. Witt; William M. Johnson, all of Austin, Tex.

[73] Assignee: Advanced Micro Devices, Inc., Sunnyvale, Calif.

[21] Appl. No.: 08/561,073

[22] Filed: Nov. 20, 1995

[51] Int. Cl.[6] .................................................... G06F 12/00
[52] U.S. Cl. ......................... 711/132; 711/118; 711/120; 395/376
[58] Field of Search ..................... 395/459, 445, 395/447, 449, 468, 800.01, 376; 711/118, 120, 121, 132, 141, 128

[56] References Cited

U.S. PATENT DOCUMENTS

| | | | |
|---|---|---|---|
| 3,840,864 | 10/1974 | Chang et al. | 395/436 |
| 4,044,338 | 8/1977 | Wolf | 365/49 |
| 4,453,212 | 6/1984 | Gaither et al. | 395/402 |
| 4,695,943 | 9/1987 | Keeley et al. | 395/467 |
| 4,807,115 | 2/1989 | Torng | 395/391 |
| 4,858,105 | 8/1989 | Kuriyama et al. | 395/582 |
| 5,226,126 | 7/1993 | McFarland et al. | 395/394 |
| 5,226,130 | 7/1993 | Favor et al. | 395/585 |
| 5,386,547 | 1/1995 | Jouppi | 395/449 |
| 5,388,245 | 2/1995 | Wong | 395/445 |
| 5,537,575 | 7/1996 | Foley et al. | 395/468 |
| 5,542,062 | 7/1996 | Taylor et al. | 395/403 |
| 5,564,035 | 10/1996 | Lai | 395/471 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel 1994 Pentium Processor Family User's Manual, vol. 1: Pentium Processor Family Data Book, pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman,. "P6: The Next Step?," PC Magazine, Sep. 12, 1995, 16 pages.

Tom R. Halfhill, "AMD K6 Takes On Intel P6," Byte, Jan. 1996, 4 pages.

*Primary Examiner*—Larry D. Donaghue
*Assistant Examiner*—Walter D. Davis, Jr.
*Attorney, Agent, or Firm*—Conley, Rose & Tayon; B. Noel Kivlin; Lawrence J. Merkel

[57] ABSTRACT

A microprocessor including a pair of caches is provided. One of the pair of caches is accessed by stack-relative memory accesses from the decode stage of the instruction processing pipeline. The second of the pair of caches is accessed by memory accesses from the execute stage of the instruction processing pipeline. When a miss is detected in the first of the pair of caches, the stack-relative memory access which misses is conveyed to the execute stage of the instruction processing pipeline. When the stack-relative memory access accesses the second of the pair of caches, the cache line containing the access is transmitted to the first of the pair of caches for storage. The first of the pair of caches selects a victim line for replacement when the data is transferred from the second of the pair of caches. If the victim line has been modified while stored in the first cache, then the victim line is stored in a copyback buffer. A signal is asserted by the first cache to inform the second cache of the need to perform a victim line copyback. Requests from the execute stage of the instruction processing pipeline are stalled to allow the copyback to occur.

27 Claims, 6 Drawing Sheets

METHOD FOR TRANSFERRING DATA BETWEEN A PAIR OF CACHES CONFIGURED TO BE ACCESSED FROM DIFFERENT STAGES OF AN INSTRUCTION PROCESSING PIPELINE

BACKGROUND OF THE INVENTION

1. Field of the Invention

This invention relates to the field of superscalar microprocessors and, more particularly, to a method for transferring data between a pair of caches within said microprocessor.

2. Description of the Relevant Art

Superscalar microprocessors achieve high performance by simultaneously executing multiple instructions in a clock cycle and by specifying the shortest possible clock cycle consistent with the design. As used herein, the term "clock cycle" refers to an interval of time during which the pipeline stages of a microprocessor perform their intended functions. Memory elements (such as registers and arrays) capture the resulting values according to a clock signal defining the clock cycle.

Since superscalar microprocessors execute multiple instructions per clock cycle and the clock cycle is short, a high bandwidth memory system is required to provide instructions and data to the superscalar microprocessor (i.e. a memory system that can provide a large number of bytes in a short period of time). Without a high bandwidth memory system, the microprocessor would spend a large number of clock cycles waiting for instructions or data to be provided, then would execute the received instructions and/or the instructions dependent upon the received data in a relatively small number of clock cycles. Overall performance would be degraded by the large number of idle clock cycles. Unfortunately, superscalar microprocessors are ordinarily configured into computer systems with a large main memory composed of dynamic random access memory (DRAM) cells. DRAM cells are characterized by access times which are significantly longer than the clock cycle of modern superscalar microprocessors. Also, DRAM cells typically provide a relatively narrow output bus to convey the stored bytes to the superscalar microprocessor. Therefore, DRAM cells provide a memory system that provides a relatively small number of bytes in a relatively long period of time, and do not form a high bandwidth memory system.

Because superscalar microprocessors are typically not configured into a computer system with a memory system having sufficient bandwidth to continuously provide instructions and data, superscalar microprocessors are often configured with caches. Caches are storage devices containing multiple blocks of storage locations, configured on the same silicon substrate as the microprocessor or coupled nearby. The blocks of storage locations are used to hold previously fetched instruction or data bytes. The bytes can be transferred from the cache to the destination (e.g. a register or an instruction processing pipeline) quickly; commonly one or two clock cycles are required as opposed to a large number of clock cycles to transfer bytes from a DRAM main memory.

Caches may be organized into an "associative" structure (also referred to as "set associative"). In an associative structure, the blocks of storage locations are accessed as a two-dimensional array having rows and columns. When a cache is searched for bytes residing at an address, a number of bits from the address are used as an "index" into the cache. The index selects a particular row within the two-dimensional array, and therefore the number of address bits required for the index is determined by the number of rows configured into the cache. The act of selecting a row via an index is referred to as "indexing". The addresses associated with bytes stored in the multiple blocks of a row are examined to determine if any of the addresses stored in the row match the requested address. If a match is found, the access is said to be a "hit", and the cache provides the associated bytes. If a match is not found, the access is said to be a "miss". When a miss is detected, the bytes are transferred from the memory system into the cache. The addresses associated with bytes stored in the cache are also stored. These stored addresses are referred to as "tags" or "tag addresses". It is noted that an "address" is indicative of a storage location within the main memory of a computer system at which a particular value is stored.

Several blocks of storage locations are configured into a row of an associative cache. Each block of storage locations is referred to as a "way"; multiple ways comprise a row. The way is selected by providing a way value to the cache. The way value is determined by examining the tags for a row and finding a match between one of the tags and the requested address. A cache designed with one way per row is referred to as a "direct-mapped cache". In a direct-mapped cache, the tag must be examined to determine if an access is a hit, but the tag examination is not required to select which bytes are transferred to the outputs of the cache. Since only an index is required to select bytes from a direct-mapped cache, the direct-mapped cache is a "linear array" requiring only a single value to select a storage location within it. It is noted a set of contiguous bytes which may fill a block of storage locations within the cache is often referred to as a "cache line".

A high bandwidth memory system is particularly important to a microprocessor implementing the x86 microprocessor architecture. The x86 architecture implements a relatively small register set including several registers which are not general purpose. Registers which are not general purpose may not be used to store an arbitrary value because the value they store has a specific interpretation for certain instructions. Consequently, many data values which a program is manipulating are stored within a stack. As will be appreciated by those of skill in the art, a stack is a data storage structure implementing a last-in, first-out storage mechanism. Data is "pushed" onto a stack (i.e. the data is stored into the stack data structure) and "popped" from the stack (i.e. the data is removed from the stack data structure). When the stack is popped, the data removed is the data that was most recently pushed. The ESP register of the x86 architecture stores the address of the "top" of a stack within main memory. The top of the stack is the storage location which is storing the data that would be provided if the stack is popped.

Since data on the stack is manipulated often, a method for providing relatively quick access to data on the stack is desired. In particular, accessing stack data as early as possible in the instruction processing pipeline may improve microprocessor performance by allowing instructions which access the stack to fetch their operands early. As used herein, the term "instruction processing pipeline" refers to a pipeline which performs instruction processing. Instruction processing may include fetching, decoding, executing, and writing the results of each instruction. An instruction processing pipeline is formed by a number of pipeline stages in which portions of instruction processing are performed. A particular stage may require more than one clock cycle to perform its function. Often, such a stage includes several memory elements through which the instruction may flow. A decode stage of the instruction processing pipeline performs the decoding of an instruction. Decoding may include determining what type of instruction is to be executed and accessing the register operands. An execute stage of an instruction processing pipeline may include executing the decoded instruction to produce a result. Many other stages may be defined for a particular instruction processing pipeline.

Typically, memory operands (both stack and non-stack) are accessed from the execute stage of the instruction processing pipeline. As used herein, the term "operand" refers to a value which an instruction is intended to manipulate. Operands may be memory operands (which are stored in memory) or register operands (which are stored in registers).

SUMMARY OF THE INVENTION

The problems outlined above are in large part solved by a microprocessor including a pair of caches. One of the pair of caches is accessed by stack-relative memory accesses from the decode stage of the instruction processing pipeline. The second of the pair of caches is accessed by memory accesses from the execute stage of the instruction processing pipeline. When a miss is detected in the first of the pair of caches, the stack-relative memory access which misses is conveyed to the execute stage of the instruction processing pipeline. When the stack-relative memory access accesses the second of the pair of caches, the cache line containing the access is transmitted to the first of the pair of caches for storage. Advantageously, a separate port for transferring data from the second of the pair of caches to the first of the pair of caches is not required. The silicon area utilized for the second of the pair of caches is beneficially reduced with respect to designs in which a separate port is used.

The first of the pair of caches selects a victim line for replacement when the data is transferred from the second of the pair of caches. If the victim line has been modified while stored in the first cache, then the victim line is stored in a copyback buffer. A signal is asserted by the first cache to inform the second cache of the need to perform a victim line copyback. Requests from the execute stage of the instruction processing pipeline are stalled to allow the copyback to occur. Advantageously, a separate port for copybacks is not employed.

Broadly speaking, the present invention contemplates a method for transferring data between a pair of caches configured to be accessed at different stages of an instruction processing pipeline. The method comprises determining that a memory access is a miss within a first one of the pair of caches during a decode stage of the instruction processing pipeline. Additionally, the memory access is determined to be a hit within a second one of the pair of caches during an execute stage of the instruction processing pipeline. Furthermore, the method comprises transferring the data to the first of the pair of caches concurrently with determining that the memory access is a hit within the second of the pair of caches.

The present invention further contemplates a microprocessor comprising a data cache, a load/store unit, a stack cache, and a plurality of decode units. The data cache is configured to store data associated with stack-relative and non-stack relative memory accesses. The stack cache is coupled to the data cache to receive data associated with stack-relative memory accesses. The stack cache is configured to store data associated with the stack-relative memory accesses. Coupled to the stack cache and the data cache, the load/store unit is configured to convey stack-relative and non-stack-relative memory accesses to the stack cache and to the data cache. Also coupled to the stack cache, the plurality of decode units are configured to detect stack-relative memory accesses and to convey the stack-relative memory accesses to the stack cache.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
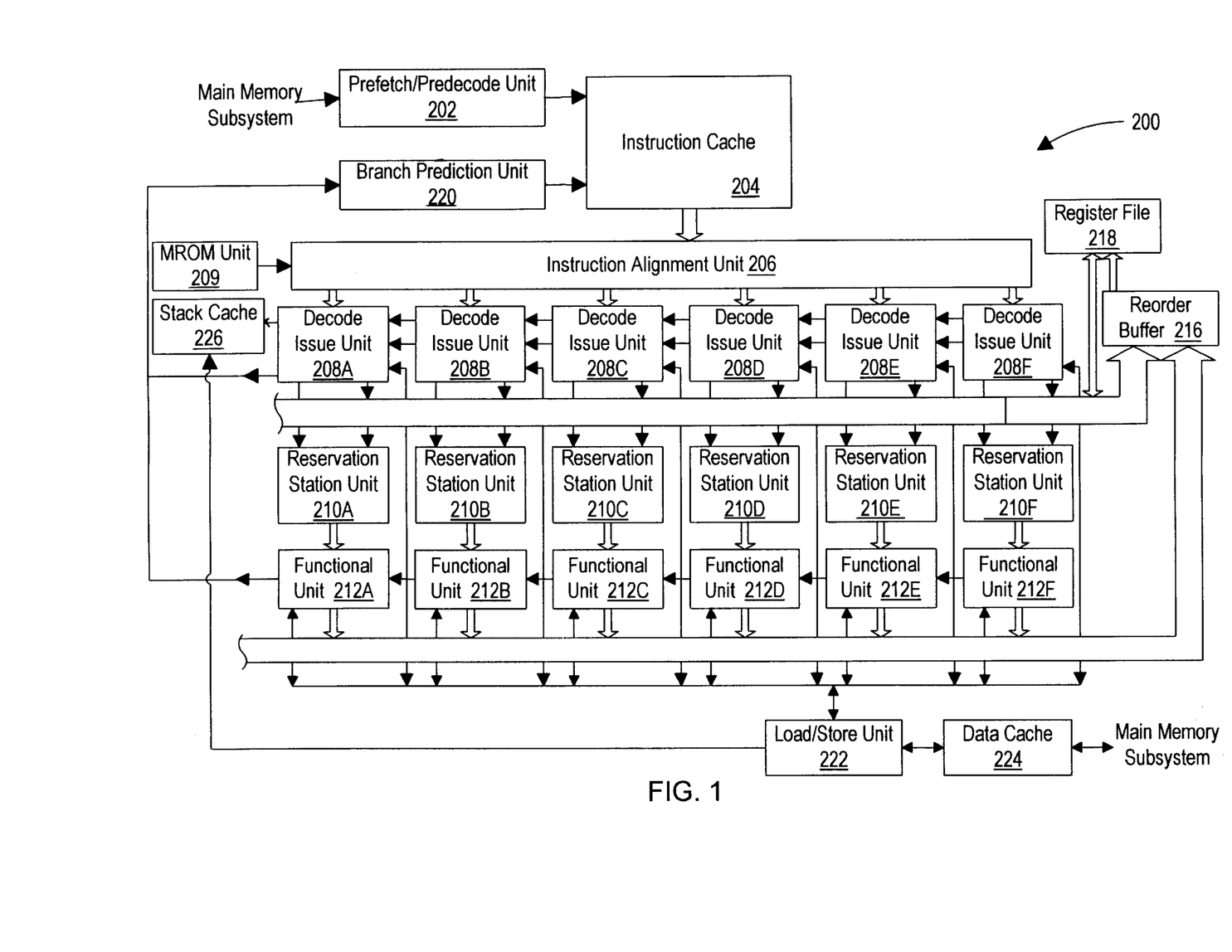
FIG. 1 is a block diagram of a superscalar microprocessor including a stack cache, a data cache, a reorder buffer, and a load/store unit.

Turning now to FIG. 1, a block diagram of a superscalar microprocessor 200 including a stack cache 226, a data cache 224, a load/store unit 222, and a reorder buffer 216 in accordance with the present invention is shown. As illustrated in the embodiment of FIG. 1, superscalar microprocessor 200 includes a prefetch/predecode unit 202 and a branch prediction unit 220 coupled to an instruction cache 204. An instruction alignment unit 206 is coupled between instruction cache 204 and a plurality of decode units 208A–208F (referred to collectively as decode units 208). Each decode unit 208A–208F is coupled to respective reservation station units 210A–210F (referred to collectively as reservation stations 210), and each reservation station 210A–210F is coupled to a respective functional unit 212A–212F (referred to collectively as functional units 212). Decode units 208, reservation stations 210, and functional units 212 are further coupled to a reorder buffer 216, a register file 218 and a load/store unit 222. A data cache 224 is shown coupled to load/store unit 222, and an MROM unit 209 is shown coupled to instruction alignment unit 206. Finally, stack cache 226 is coupled to load/store unit 222, decode units 208, data cache 224, and reorder buffer 216.

Generally speaking, instruction cache 204 is a high speed cache memory provided to temporarily store instructions prior to their dispatch to decode units 208. In one embodiment, instruction cache 204 is configured to cache up to 32 kilobytes of instruction code organized in lines of 16 bytes each (where each byte consists of 8 bits). During operation, instruction code is provided to instruction cache 204 by prefetching code from a main memory (not shown) through prefetch/predecode unit 202. It is noted that instruction cache 204 could be implemented in a set-associative, a fully-associative, or a direct-mapped configuration.

Prefetch/predecode unit 202 is provided to prefetch instruction code from the main memory for storage within instruction cache 204. In one embodiment, prefetch/predecode unit 202 is configured to burst 64-bit wide code from the main memory into instruction cache 204. It is understood that a variety of specific code prefetching techniques and algorithms may be employed by prefetch/predecode unit 202.

As prefetch/predecode unit 202 fetches instructions from the main memory, it generates three predecode bits associated with each byte of instruction code: a start bit, an end bit, and a "functional" bit. The predecode bits form tags indicative of the boundaries of each instruction. The predecode tags may also convey additional information such as whether a given instruction can be decoded directly by decode units 208 or whether the instruction must be executed by invoking a microcode procedure controlled by MROM unit 209, as will be described in greater detail below.

Table 1 indicates one encoding of the predecode tags. As indicated within the table, if a given byte is the first byte of an instruction, the start bit for that byte is set. If the byte is the last byte of an instruction, the end bit for that byte is set. If a particular instruction cannot be directly decoded by the decode units 208, the functional bit associated with the first byte of the instruction is set. On the other hand, if the instruction can be directly decoded by the decode units 208, the functional bit associated with the first byte of the instruction is cleared. The functional bit for the second byte of a particular instruction is cleared if the opcode is the first byte, and is set if the opcode is the second byte. It is noted that in situations where the opcode is the second byte, the first byte is a prefix byte. The functional bit values for instruction byte numbers 3–8 indicate whether the byte is a MODRM or an SIB byte, or whether the byte contains displacement or immediate data.

TABLE 1

Encoding of Start, End and Functional Bits

| Instr. Byte Number | Start Bit Value | End Bit Value | Functional Bit Value | Meaning |
|---|---|---|---|---|
| 1 | 1 | X | 0 | Fast decode |
| 1 | 1 | X | 1 | MROM instr. |
| 2 | 0 | X | 0 | Opcode is first byte |
| 2 | 0 | X | 1 | Opcode is this byte, first byte is prefix |
| 3–8 | 0 | X | 0 | Mod R/M or SIB byte |
| 3–8 | 0 | X | 1 | Displacement or immediate data; the second functional bit set in bytes 3–8 indicates immediate data |

TABLE 1-continued

Encoding of Start, End and Functional Bits

| Instr. Byte Number | Start Bit Value | End Bit Value | Functional Bit Value | Meaning |
|---|---|---|---|---|
| 1–8 | X | 0 | X | Not last byte of instruction |
| 1–8 | X | 1 | X | Last byte of instruction |

As stated previously, in one embodiment certain instructions within the x86 instruction set may be directly decoded by decode units 208. These instructions are referred to as "fast path" instructions. The remaining instructions of the x86 instruction set are referred to as "MROM instructions". MROM instructions are executed by invoking MROM unit 209. More specifically, when an MROM instruction is encountered, MROM unit 209 parses and serializes the instruction into a subset of defined fast path instructions to effectuate a desired operation.

Instruction alignment unit 206 is provided to channel variable byte length instructions from instruction cache 204 to fixed issue positions formed by decode units 208A–208F. In one embodiment, instruction alignment unit 206 independently and in parallel selects instructions from three groups of instruction bytes provided by instruction cache 204 and arranges these bytes into three groups of preliminary issue positions. Each group of issue positions is associated with one of the three groups of instruction bytes. The preliminary issue positions are then merged together to form the final issue positions, each of which is coupled to one of decode units 208.

Before proceeding with a detailed description of the transfer of data between stack cache 226 and data cache 224, general aspects regarding other subsystems employed within the exemplary superscalar microprocessor 200 of FIG. 1 will be described. For the embodiment of FIG. 1, each of the decode units 208 includes decoding circuitry for decoding the predetermined fast path instructions referred to above. In addition, each decode unit 208A–208F routes displacement and immediate data to a corresponding reservation station unit 210A–210F. Output signals from the decode units 208 include bit-encoded execution instructions for the functional units 212 as well as operand address information, immediate data and/or displacement data.

Decode units 208 additionally detect "stack-relative" memory accesses. As used herein, a "stack-relative" memory access is a memory access utilizing an addressing mode that is indicative of a stack access (as defined in the x86 architecture, for example). In one embodiment, a stack-relative memory access is a memory access in which the address is formed using the value stored in the ESP or EBP registers of the x86 architecture along with a possible offset specified by the instruction. The offset may be immediate data provided with the instruction. Decode units 208 are capable of generating a current ESP or EBP value even though some instructions prior to the instructions being decoded may not have executed yet. Most instructions modify the ESP or EBP in predictable ways (i.e. the PUSH instruction decrements the ESP by the size of the operand in bytes). Therefore, decode units 208 may speculatively generate the value of the ESP or EBP given an initial value and a decode of instructions between that initial value and the instructions currently being decoded. Exemplary hardware for this function is described in the commonly assigned, co-pending patent application entitled: "A Lookahead Register Value Generator and a Superscalar Microprocessor Employing the Same", Ser. No. 08/480,092 filed Jun. 7, 1995 by Pflum. The disclosure of this patent application is incorporated herein by reference in its entirety. If a particular decode unit 208A–208F detects a stack-relative memory access, then the decode unit generates the address associated with the stack-relative memory access and conveys the address to stack cache 226. If the data exists within stack cache 226 and the memory access is a read, the data is transferred to the respective reservation station 210A–210F. Advantageously, stack-relative memory accesses occur in the decode stage of the instruction processing pipeline. A memory access may be a read access, in which bytes are transferred from memory to a destination specified by the instruction, or a write access, in which bytes are transferred from a source specified by the instruction to memory. The location in memory referenced by the access is determined by the access address associated with the access.

A "non-stack-relative" memory access is a memory access utilizing an addressing mode which is not indicative of a stack access. However, non-stack-relative memory accesses may access the stack. In the x86 architecture, for example, indirect addressing utilizing a register other than the ESP or EBP registers is a non-stack-relative memory access. As will be appreciated by those skilled in the art, indirect addressing is an addressing mode wherein the address is formed from the value stored in a register. In some cases, the address is formed by adding the value in the register to an offset provided with the instruction. The offset may be directly provided with the instruction, or indirectly through a register. The x86 architecture includes several registers, for example an EAX register, which may be used to provide the address of an operand via indirect addressing. If the EAX register specifies an address within the stack (as located by the ESP register), then a dependency may exist between the memory access specified by the EAX register and memory accesses generated from the ESP or EBP registers. Microprocessor 200 additionally classifies memory accesses having an address formed from the ESP or EBP registers and an indirect value stored in another register as non-stack-relative memory accesses. In one embodiment, decode units 208 are not configured to generate an address for a non-stack-relative memory access. Instead, these addresses are generated by functional units 212 during a subsequent clock cycle. It is noted that in the embodiment of FIG. 1, decode units 208 form the decode stage of the instruction processing pipeline while functional units 212 and load/store unit 222 form the execute stage.

The superscalar microprocessor of FIG. 1 supports out of order execution, and thus employs reorder buffer 216 to keep track of the original program sequence for register read and write operations, to implement register renaming, to allow for speculative instruction execution and branch misprediction recovery, and to facilitate precise exceptions. As will be appreciated by those of skill in the art, a temporary storage location within reorder buffer 216 is reserved upon decode of an instruction that involves the update of a register to thereby store speculative register states. Reorder buffer 216 may be implemented in a first-in-first-out configuration wherein speculative results move to the "bottom" of the buffer as they are validated and written to the register file, thus making room for new entries at the "top" of the buffer. Other specific configurations of reorder buffer 216 are also possible. If a branch prediction is incorrect, the results of speculatively-executed instructions along the mispredicted path can be invalidated in the buffer before they are written to register file 218.

The bit-encoded execution instructions and immediate data provided at the outputs of decode units 208A–208F are routed directly to respective reservation station units 210A–210F. In one embodiment, each reservation station unit 210A–210F is capable of holding instruction information (i.e., bit encoded execution bits as well as operand values, operand tags and/or immediate data) for up to three pending instructions awaiting issue to the corresponding functional unit. It is noted that for the embodiment of FIG. 1, each decode unit 208A–208F is associated with a dedicated reservation station unit 210A–210F, and that each reservation station unit 210A–210F is similarly associated with a dedicated functional unit 212A–212F. Accordingly, six dedicated "issue positions" are formed by decode units 208, reservation station units 210 and functional units 212. Instructions aligned and dispatched to issue position 0 through decode unit 208A are passed to reservation station unit 210A and subsequently to functional unit 212A for execution. Similarly, instructions aligned and dispatched to decode unit 208B are passed to reservation station unit 210B and into functional unit 212B, and so on.

It is noted that in one embodiment, the bit-encoded execution instructions comprise several one-hot encodings. A one-hot encoding includes values in which at most one bit of the value is set. For example, a one-hot encoding configured to assume eight different values is eight bits wide. Each one of the eight bits being set while the other seven bits are clear is indicative of a particular one of the eight values. Since no bits of a one-hot bit-encoded instruction are combined to determine the indicated instruction, the one-hot encoding may reduce the number of cascaded levels of logic used to perform the instruction within a functional unit 212. It is further noted that in one embodiment, the bit-encoded execution instructions are physically stored within the functional units 212.

Upon decode of a particular instruction, if a required operand is a register location, register address information is routed to reorder buffer 216 and register file 218 simultaneously. Those of skill in the art will appreciate that the x86 register file includes eight 32 bit real registers (i.e., typically referred to as EAX, EBX, ECX, EDX, EBP, ESI, EDI and ESP). Reorder buffer 216 contains temporary storage locations for results which change the contents of these registers to thereby allow out of order execution. A temporary storage location of reorder buffer 216 is reserved for each instruction which, upon decode, is determined to modify the contents of one of the real registers. Therefore, at various points during execution of a particular program, reorder buffer 216 may have one or more locations which contain the speculatively executed contents of a given register. If following decode of a given instruction it is determined that reorder buffer 216 has a previous location or locations assigned to a register used as an operand in the given instruction, the reorder buffer 216 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 216 rather than from register file 218. If there is no location reserved for a required register in reorder buffer 216, the value is taken directly from register file 218. If the operand corresponds to a memory location, the operand value is provided to the reservation station unit through load/store unit 222 or stack cache 226.

Reorder buffer 216 is additionally responsible for completing stack-relative write accesses to stack cache 226. When an instruction which writes a stack memory location within stack cache 226 retires, reorder buffer 216 conveys the data bytes to be written to stack cache 226. An instruction "retires" when prior instructions have completed without causing an exception and the instruction's results are written to stack cache 226, data cache 224, or register file 218. If stack cache 226 is written to, it stores the data bytes in the appropriate storage location. During a later clock cycle, stack cache 226 may discard a cache line containing data bytes written in this fashion. At the time the data bytes are removed from stack cache 226, they are transferred to data cache 224.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, filed Oct. 29, 1993 by Witt, et al. These documents are incorporated herein by reference in their entirety.

Reservation station units 210A–210F are provided to temporarily store instruction information to be speculatively executed by the corresponding functional units 212A–212F. As stated previously, each reservation station unit 210A–210F may store instruction information for up to three pending instructions. Each of the six reservation stations 210A–210F contain locations to store bit-encoded execution instructions to be speculatively executed by the corresponding functional unit and the values of operands. If a particular operand is not available, a tag for that operand is provided from reorder buffer 216 and is stored within the corresponding reservation station until the result has been generated (i.e., by completion of the execution of a previous instruction). It is noted that when an instruction is executed by one of the functional units 212A–212F, the result of that instruction is passed directly to any reservation station units 210A–210F that are waiting for that result at the same time the result is passed to update reorder buffer 216 (this technique is commonly referred to as "result forwarding"). Instructions are issued to functional units for execution after the values of any required operand(s) are made available. That is, if an operand associated with a pending instruction within one of the reservation station units 210A–210F has been tagged with a location of a previous result value within reorder buffer 216 which corresponds to an instruction which modifies the required operand, the instruction is not issued to the corresponding functional unit 212 until the operand result for the previous instruction has been obtained. Accordingly, the order in which instructions are executed may not be the same as the order of the original program instruction sequence. Reorder buffer 216 ensures that data coherency is maintained in situations where read-after-write dependencies occur.

In one embodiment, each of the functional units 212 is configured to perform integer arithmetic operations of addition and subtraction, as well as shifts, rotates, logical operations, and branch operations. It is noted that a floating point unit (not shown) may also be employed to accommodate floating point operations.

Each of the functional units 212 also provides information regarding the execution of conditional branch instructions to the branch prediction unit 220. If a branch prediction was incorrect, branch prediction unit 220 flushes instructions subsequent to the mispredicted branch that have entered the instruction processing pipeline, and causes prefetch/predecode unit 202 to fetch the required instructions from instruction cache 204 or main memory. It is noted that in such situations, results of instructions in the original program sequence which occur after the mispredicted branch instruction are discarded, including those which were speculatively executed and temporarily stored in load/store unit 222 and reorder buffer 216. Exemplary configurations of suitable branch prediction mechanisms are well known.

Results produced by functional units 212 are sent to the reorder buffer 216 if a register value is being updated, and to the load/store unit 222 if the contents of a memory location is changed. If the result is to be stored in a register, the reorder buffer 216 stores the result in the location reserved for the value of the register when the instruction was decoded. As stated previously, results are also broadcast to reservation station units 210A–210F where pending instructions may be waiting for the results of previous instruction executions to obtain the required operand values.

Generally speaking, load/store unit 222 provides an interface between functional units 212A–212F and data cache 224. In one embodiment, load/store unit 222 is configured with a load/store buffer with eight storage locations for data and address information for pending loads or stores. Decode units 208 arbitrate for access to load/store unit 222 in order to place non-stack-relative memory accesses as well as stack-relative memory accesses that may not be completed by stack cache 226 into the load/store buffer. When the buffer is full, a decode unit must wait until the load/store unit 222 has room for the pending load or store request information. Load/store unit 222 also performs dependency checking for load memory accesses against pending store memory accesses to ensure that data coherency is maintained.

Data cache 224 is a high speed cache memory provided to temporarily store data being transferred between load/store unit 222 and the main memory subsystem. In one embodiment, data cache 224 has a capacity of storing up to eight kilobytes of data. It is understood that data cache 224 may be implemented in a variety of specific memory configurations, including a set associative configuration.

Stack cache 226 is a high speed cache memory provided to temporarily store stack data. In one embodiment, stack cache 226 is configured to store eight lines of 32 bytes each. It is understood that stack cache 226 may be implemented in a direct-mapped, set-associative, or fully associative configuration. Data stored within stack cache 226 may also be stored within data cache 224. When a stack-relative memory access is detected by a decode unit 208 and the associated data is not stored within stack cache 226, then the associated data is transferred to stack cache 226 from data cache 224. Additionally, if the line being replaced within stack cache 226 contains data bytes that are the result of a write access, the replaced line is conveyed to data cache 224. It is noted that such a transfer may be accomplished as described further below.

Since stack cache 226 and data cache 224 may simultaneously store the same data, coherency is maintained between the two caches. Dependency checking is performed between accesses to the pair of caches such that each read and write memory access receives the appropriate data and occurs in the appropriate order. For example, if a read access occurs in program order subsequent to a write access to the same address, then the read access should result in the transfer of data bytes generated by the write access. Memory access dependency checking thus involves determining the program order of the memory accesses as well as the addresses to which the accesses are performed. It is noted that exemplary dependency checking structures are described in the commonly assigned, co-pending patent applications entitled: "A Reorder Buffer Capable of Detecting Dependencies Between Accesses to a Pair of Caches" by Tran and "A Dependency Checking Structure for a Pair of Caches Which are Accessed from Different Pipeline Stages of an Instruction Processing Pipeline" by Pflum. The referenced patent applications are filed concurrently herewith and are incorporated herein by reference in their entirety.

Figure 2:
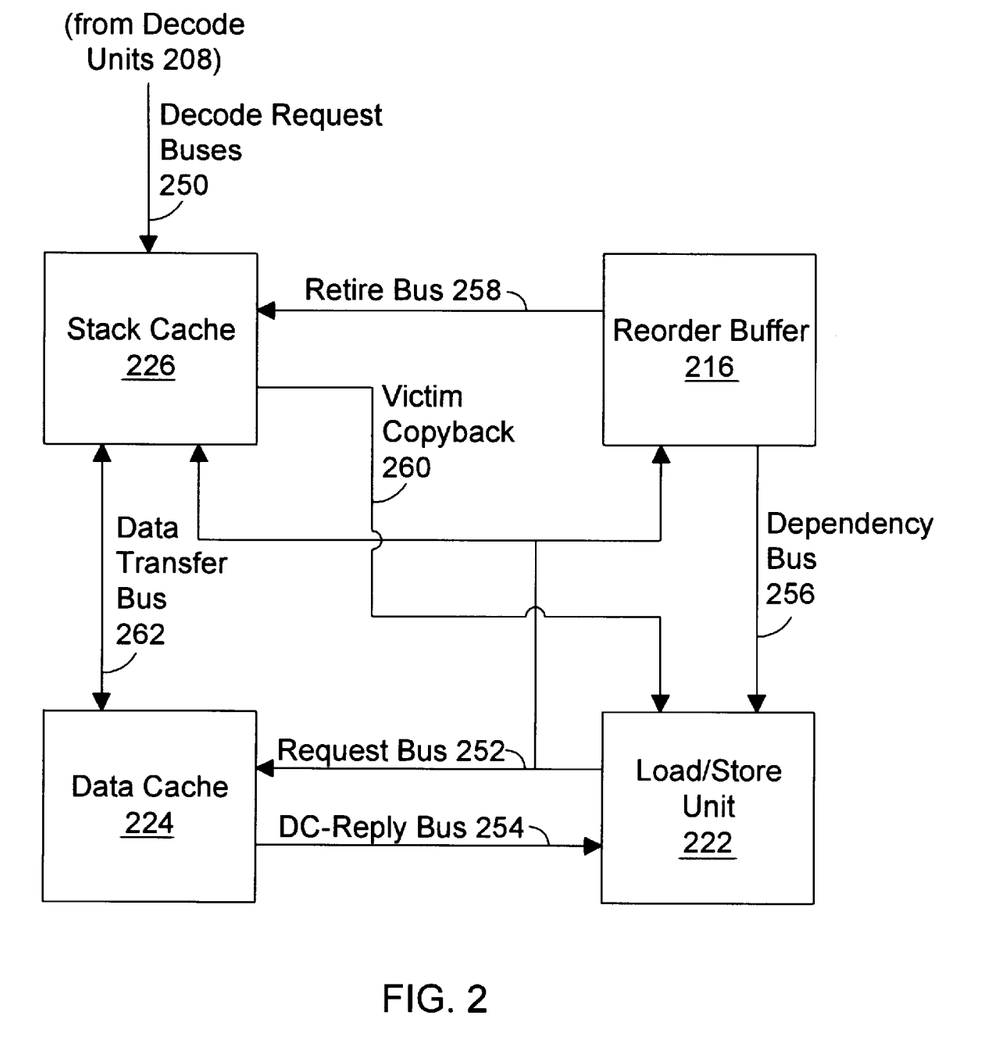
FIG. 2 is a block diagram of the stack cache, data cache, reorder buffer and load/store unit shown in FIG. 1, highlighting interconnections between these blocks.

Turning next to FIG. 2, a block diagram of stack cache 226, data cache 224, load/store unit 222, and reorder buffer 216 is shown. FIG. 2 highlights the interconnections between these blocks according to one embodiment of the present invention. Other interconnections which may exist between these blocks are omitted for clarity. A plurality of stack-relative memory accesses may be conveyed upon decode request buses 250 from decode units 208 to stack cache 226. A request bus 252 coupled between load/store unit 222, data cache 224, stack cache 226, and reorder buffer 216 is configured to convey memory accesses initiated by load/store unit 222. A DC_reply bus 254 coupled between load/store unit 222 and data cache 224 is provided for the conveyance of data and cache hit/miss information related to memory accesses conveyed upon request bus 252. Dependency checking information is conveyed from reorder buffer 216 to load/store unit 222 upon a dependency bus 256. A retire bus 258 is coupled between stack cache 226 and reorder buffer 216 to provide a channel for retiring stack-relative write accesses. When stack cache 226 discards data and the data has been updated while stored within stack cache 226, a victim copyback signal upon a victim copyback conductor 260 is asserted. Victim copyback data as well as data to be stored into stack cache 226 is conveyed upon a data transfer bus 262.

Generally speaking, when a stack-relative memory access is detected by decode units 208, the memory access is conveyed upon one of decode request buses 250. If the memory access is a hit within stack cache 226, the data is provided to the associated reservation station 210. If the memory access is a miss within stack cache 226, then the memory access is transferred to load/store unit 222.

Load/store unit 222 conveys the stack-relative memory access upon request bus 252 to data cache 224. If the memory access is a hit in data cache 224, the data associated with the memory access and an indication of the hit are conveyed upon DC_reply bus 254 to load/store unit 222. Additionally, the cache line including the data associated with the memory access is conveyed to stack cache 226 upon data transfer bus 262. In this manner, stack cache 226 receives cache lines accessed by stack-relative memory accesses. Advantageously, subsequent stack-relative memory accesses to the same cache line may hit in stack cache 226 and thereby be completed from the decode stage of the instruction processing pipeline. Additionally, the cache line is transferred to stack cache 226 during an access to data cache 224 by load/store unit 222. Therefore, an extra port is not needed for stack cache 226 to access data cache 224. Instead, the ports already allocated to load/store unit 222 are used to provide access to data cache 224 in order to transfer the cache line. The access occurs simultaneously with forwarding the data associated with the stack-relative memory access which missed. It is noted that adding a port to data cache 224 often significantly increases the silicon area occupied by data cache 224. Therefore, the present arrangement may reduce silicon area used by data cache 224 while still providing for the functionality of stack cache 226.

It is noted that a "port" upon a cache is an access point through which a memory access may search the cache for data associated with the memory access. It is further noted that if the stack-relative memory access misses data cache 224, the cache line is fetched from external memory. Both data cache 224 and stack cache 226 receive the line.

When stack cache 226 detects a stack-relative memory access being conveyed by load/store unit 222 to data cache 224, a "victim" line may be selected for replacement. As used herein, a victim line is a cache line which is discarded from a cache when a new cache line is to be stored within the cache. If the selected victim line has been updated during the time it was stored in stack cache 226, then the victim line is written to data cache 224. In this embodiment, the victim line is guaranteed to be stored in data cache 224 if it is stored in stack cache 226. A bit in the tags of each line within data cache 224 is indicative, when set, that the line is stored in stack cache 226. If this bit is set for a particular line, data cache 224 does not replace the particular line upon refill of a cache line which misses data cache 224. Therefore, the line remains in data cache 224 until it is discarded by stack cache 226. The victim copyback signal upon conductor 260 is asserted by stack cache 226 when the selected victim line is to be written to data cache 224. Load/store unit 222 receives the signal and refrains from performing memory accesses to data cache 224 for at least one subsequent clock cycle. Stack cache 226 transfers the victim line to data cache 224 during these idle clock cycles. Data cache 224 stores the victim line, using the port or ports idled by load/store unit 222. Advantageously, the existing ports used by load/store unit 222 may additionally be used to perform victim line copybacks.

In some circumstances, a victim line may not be selected by stack cache 226. In one embodiment, stack cache 226 is configured not to select a cache line as the victim line if a stack-relative write access to the cache line is outstanding (i.e. the write access is within reorder buffer 216 awaiting execution or retirement). Therefore, if stack-relative write accesses are outstanding to each line within stack cache 226, then no victim line is selected.

Dependency bus 256 is provided to convey dependency information between stack-relative memory accesses stored in reorder buffer 216 and memory accesses performed upon request bus 252 by load/store unit 222. In one embodiment, reorder buffer 216 provides the dependency checking function. In another embodiment, stack cache 226 provides dependency checking. In yet another embodiment, stack cache 226 and reorder buffer 216 share the dependency checking function. It is noted that load/store unit 222 performs dependency checking between the memory accesses stored within the load/store buffer.

Retire bus 258 is provided to perform stack-relative write accesses to stack cache 226. Stack-relative write accesses update stack cache 226 when the instruction associated with the write access retires. In one embodiment, stack-relative write accesses are conveyed upon decode request buses 250 when the associated instruction is decoded to determine if the accesses hit stack cache 226. Those accesses that miss are transferred to load/store unit 222. Those accesses that hit are stored in reorder buffer 216. The instruction associated with the stack-relative write access may be transferred to a functional unit 212A–212F if the instruction performs functions other than writing the stack. The stack cache line in which the stack-relative write access hits is retained within stack cache 226 until the stack-relative write access is retired, according to one embodiment.

Figure 3:
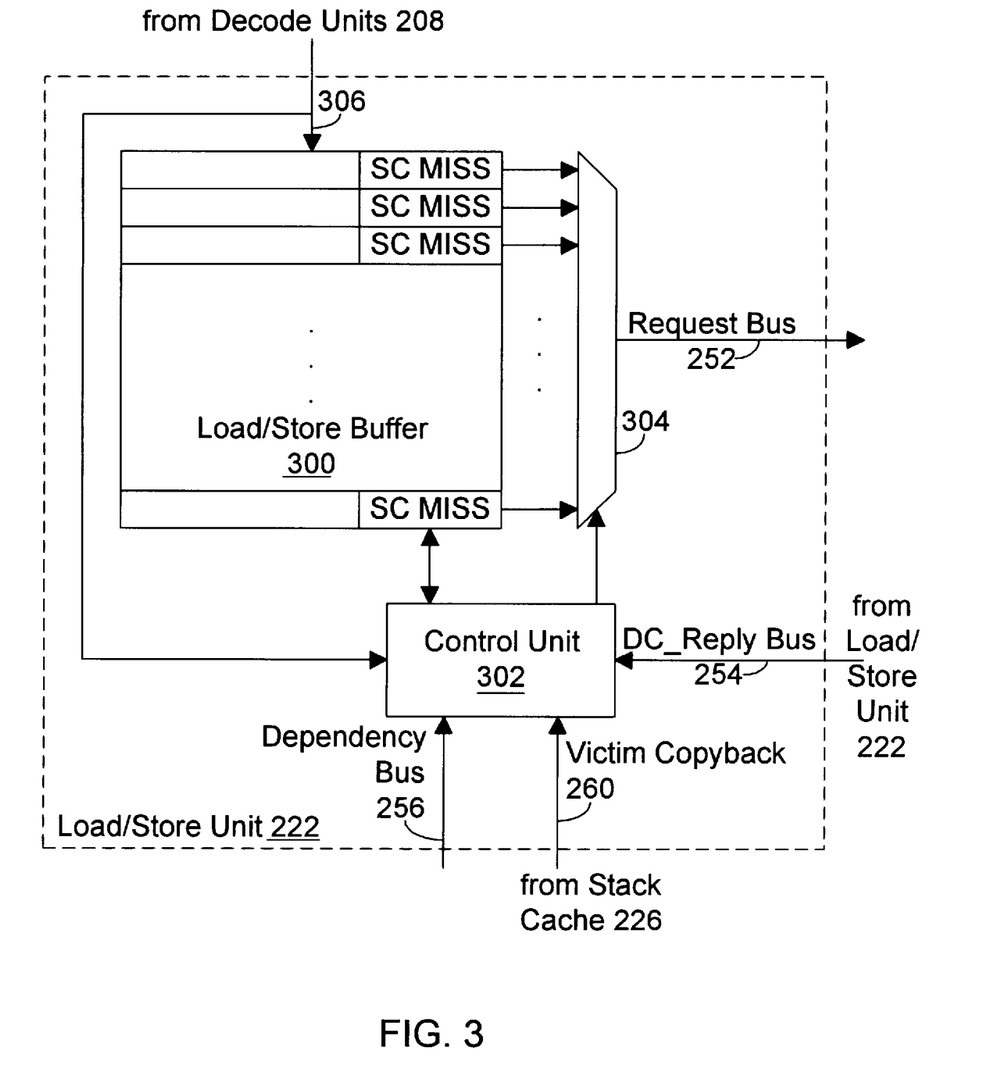
FIG. 3 is a block diagram of one embodiment of the load/store unit shown in FIGS. 1 and 2.

Turning next to FIG. 3, a block diagram of one embodiment of load/store unit 222 is shown. As shown in FIG. 3, load/store unit 222 includes a load/store buffer 300 for storing memory accesses prior to their access to data cache 224. Additionally, a control unit 302 is included to control selecting of memory accesses from load/store buffer 300 for conveyance upon request bus 252 to data cache 224. A selection multiplexor 304 is included for selecting the memory accesses. Control inputs to multiplexor 304 are provided by control unit 302. It is noted that multiplexor 304 may be implemented as multiple cascaded multiplexors or multiple multiplexor circuits.

Load/store buffer 300 is coupled to control unit 302, multiplexor 304, and a memory access bus 306. If an instruction includes a memory access, the memory access is transferred to load/store unit 222 from decode units 208 via memory access bus 306. If a memory access is stack-relative and misses stack cache 226, an indication that the access is a stack cache miss is also conveyed upon memory access bus 306. It is noted that each decode unit 208 may provide a different memory access upon memory access bus 306 during a clock cycle.

Load/store buffer 300 stores memory accesses until a clock cycle in which the memory access is selected by control unit 302 for transmittal to data cache 224. Included in each storage location within load/store buffer 300 is an SC_miss field. The SC_miss field stores the aforementioned indication that the associated memory access is a stack-relative memory access which misses stack cache 226. In one embodiment, the SC_miss field comprises a bit indicative, when set, of a stack-relative memory access.

Load/store unit 222 may be configured to transmit multiple memory accesses to data cache 224 during a clock cycle. In one embodiment, up to two load/store requests are selected per clock cycle. Data cache 224 may be an interleaved cache design in which multiple banks are independently accessible, allowing multiple accesses during a clock cycle as long as the accesses are to dissimilar banks. Each bank includes data bytes associated with a portion of a cache line. For example, if data cache 224 were an 8 bank interleaved cache and cache lines were 32 bytes, each of the 8 banks would store 4 bytes of a cache line. A first bank would store the first 4 bytes of the cache line, a second bank the second 4 bytes of the cache line, etc.

In addition to completing the memory access, stack-relative memory accesses cause the associated cache line to be transmitted to stack cache 226. In this manner, subsequent accesses to the cache line may hit in stack cache 226. Data is thereby provided for the subsequent accesses when the associated instruction is in the decode stage of the instruction processing pipeline. If data cache 224 is an interleaved cache design, the stack-relative memory access simultaneously accesses multiple banks. Control unit 302 detects that a memory access is a stack-relative memory access during selection of accesses for transmittal to data cache 224. If a stack-relative memory access is selected, then another access which may be selected during the same clock cycle may not access any of the banks which the stack-relative memory access is to access. In contrast, memory accesses which do not cause transmittal of data to stack cache 226 often access a single bank.

In one embodiment, the cache line is transferred from data cache 224 to stack cache 226 in a single clock cycle. Control unit 302 is configured not to select a second memory access for transmittal to data cache 224 during a clock cycle in which a stack-relative memory access is selected. Transmitting the cache line in one clock cycle is effected by accessing all banks of the cache, and therefore other accesses may not access a cache bank. In another embodiment, a portion of the cache line is conveyed to stack cache 226. Control unit 302 may be configured to transmit other memory accesses during a clock cycle in which a stack-relative memory access is selected, provided the bank being accessed by the other memory accesses is not the same bank as the banks being accessed by the stack-relative memory access. Stack-relative memory accesses perform an access during multiple clock cycles (preferably consecutive) to cause each portion of the cache line to be conveyed to stack cache 226. In one specific implementation, two accesses to data cache 224 are performed with respect to a particular stack-relative memory access. One half of the cache line is transmitted to stack cache 226 during each access.

Stack cache 226 may determine that a victim line has been updated. The victim copyback signal upon victim copyback conductor 260 is asserted during a clock cycle prior to performing the copyback. Control unit 302 receives the copyback signal, and is configured to select no memory accesses for transmittal to data cache 224 during the subsequent clock cycle. Data cache 224 may utilize the ports normally used for memory accesses from load/store unit 222 to perform the copyback from stack cache 226. Data associated with the victim line is transferred across data transfer bus 262 to data cache 224 and is stored therein according to the address of the victim line. If the associated cache line is no longer stored within data cache 224, data cache 224 may select a second victim line and replace it with the victim line from stack cache 226. Alternatively, data cache 224 may transmit the victim line from stack cache 226 to main memory.

In embodiments of microprocessor 200 configured to transfer a portion of a cache line between stack cache 226 and data cache 224 during a clock cycle, the victim copyback signal upon victim copyback conductor 260 is asserted for multiple clock cycles (preferably consecutive). Data is transferred for each portion of the victim line during a respective clock cycle.

Control unit 302 additionally receives dependency bus 256 and DC_reply bus 254. The dependency and cache hit/miss information thus received is utilized by control unit 302 to appropriately control load/store buffer 300. For example, if a dependency upon a stack-relative memory access is indicated upon dependency bus 256, then the associated memory access within load/store unit 222 is retained for later reaccess to data cache 224. The reaccess is performed subsequent to the completion of the stack-relative memory access upon which the dependency was detected. Similarly, if a cache miss is detected with respect to a memory access, the memory access is retained within load/store buffer 300 until the memory access becomes non-speculative. Still further, control unit 302 detects read/write dependencies between memory accesses stored within load/store buffer 300 during selection of memory accesses to be conveyed to data cache 224. If such a dependency is detected, the dependent memory access is not selected. It is noted that data associated with a read access may be directly forwarded from data cache 224 to reservation stations 210.

Figure 4:
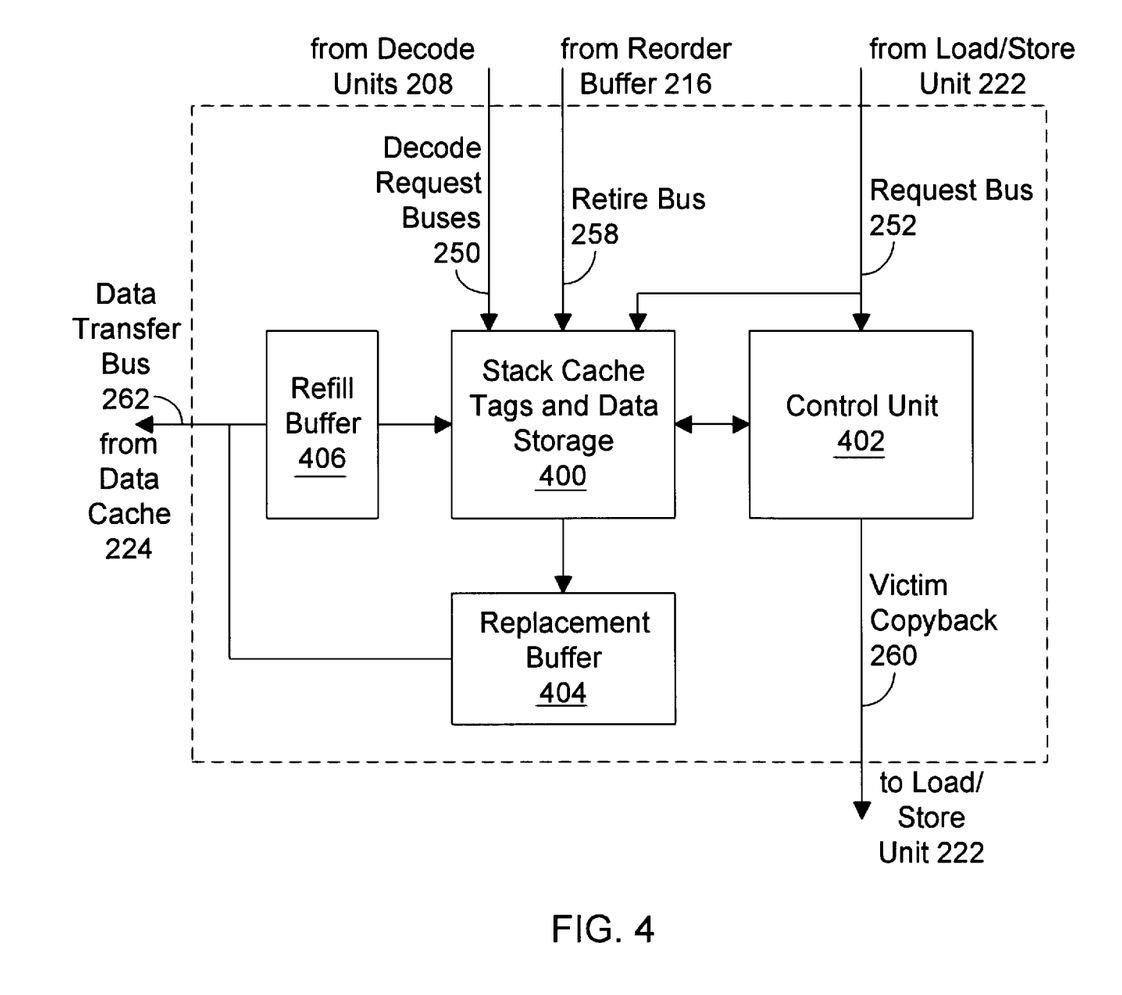
FIG. 4 is a block diagram of one embodiment of the stack cache shown in FIGS. 1 and 2.

Turning now to FIG. 4, a block diagram of stack cache 226 is shown according to one embodiment. Stack cache 226 includes a stack cache data and tags storage 400, a control unit 402, a replacement buffer 404, and a refill buffer 406. Control unit 402 is coupled to storage 400, victim copyback conductor 260, and request bus 252. Storage 400 is additionally coupled to replacement buffer 404, refill buffer 406, decode request buses 250, and retire bus 258. Replacement buffer 404 and refill buffer 406 are coupled to data transfer bus 262. Storage 400 comprises a plurality of storage locations for storing cache lines associated with stack-relative memory accesses. Additionally, storage 400 may store tag information indicative of the validity of the data, whether or not the data has been modified while stored within storage 400, and the tag address. It is noted that replacement buffer 404 and refill buffer 406 are storage locations. In one embodiment, replacement buffer 404 and refill buffer 406 comprise one or more registers.

During clock cycles in which a stack-relative memory access is conveyed by load/store unit 222 upon request bus 252, control unit 402 selects a victim line from storage 400 for replacement by the cache line associated with the stack-relative memory access. If the victim line has been modified while stored in storage 400, the victim line is copied to replacement buffer 404. Additionally, control unit 402 asserts the victim copyback signal upon victim copyback conductor 260. Data associated with the stack-relative memory access (conveyed to stack cache 226 upon data transfer bus 262) is stored in refill buffer 406. During a subsequent clock cycle, the data is copied into storage 400 if a victim line was chosen by control unit 402. It is noted that decode units 208 may be stalled during a clock cycle in which data is copied from refill buffer 406 to storage 400.

As noted above, stack cache 226 may be unable to allocate a storage location within stack cache 226 for the received line. According to one embodiment, if data stored in refill buffer 406 cannot be stored into storage 400, the data remains stored in refill buffer 406 until a subsequent cache line is transmitted from data cache 224 or until a storage location may be allocated. If a storage location is allocated during a subsequent clock cycle, the data is copied into the allocated storage location. Control unit 402 provides the associated tag address. If a subsequent cache line is transferred from data cache 224, the data associated with the subsequent cache line is stored into refill buffer 406 and the previous data is discarded. According to another embodiment, if data stored within refill buffer 406 cannot be stored into storage 400, the data is discarded.

In one embodiment, refill buffer 406 and replacement buffer 404 are configured to store a cache line of data. Additionally, replacement buffer 404 stores the tag address for conveyance to data cache 224. Refill buffer 406 and replacement buffer 404 are storage locations, and may comprise a register or registers. It is further noted that, in embodiments of microprocessor 200 in which a portion of a cache line is conveyed across data transfer bus 262 during a clock cycle, refill buffer 406 and replacement buffer 404 may each include a selection mechanism controlled by control unit 402. The selection mechanism within refill buffer 406 routes the portion of the cache line received upon data transfer bus 262 to the appropriate byte locations within refill buffer 406. The selection mechanism within replacement buffer 404 selects the portion of the cache line stored therein to be conveyed upon data transfer bus 262.

Because several clock cycles may elapse between the detection of a stack cache miss to a particular cache line and the transfer of that cache line to stack cache 226, it is possible for multiple misses within a particular cache line to be transferred to load/store unit 222. Additionally, multiple misses to the same cache line may be detected in the same clock cycle from different decode units 208, and these misses are transferred to load/store unit 222 as well. In order to avoid allocating multiple storage locations within stack cache 226 to the same cache line (i.e. allocating a new storage location each time one of the multiple misses is selected by load/store unit 222 to access data cache 224), control unit 402 examines the address provided upon request bus 252 during the access. If the cache line is stored within storage 400, then the data transfer from data cache 224 is ignored. If the cache line is not stored within storage 400, then the above mentioned cache line allocation is performed.

Decode request buses 250 and retire bus 258 are coupled to storage 400. Stack-relative memory accesses conveyed upon decode request buses 250 access storage 400. If a hit is detected within storage 400, then the associated data is conveyed to the respective reservation station 210. Additionally, data associated with stack-relative write accesses which hit in stack cache 226 is stored within storage 400 when the associated instruction is retired by reorder buffer 216.

It is noted that data transfer bus 262 is described above as transferring data between data cache 224 and stack cache 226. Data transfer bus 262 may include separate conductors coupled to replacement buffer 404 and refill buffer 406. In such an embodiment, data cache 224 conveys data upon the conductors coupled to refill buffer 406, while replacement buffer 404 conveys data and tag information upon conductors coupled thereto. Similarly, request bus 252 and decode request buses 250 may include separate conductors for each request which may be conveyed during a clock cycle.

Figure 5A:
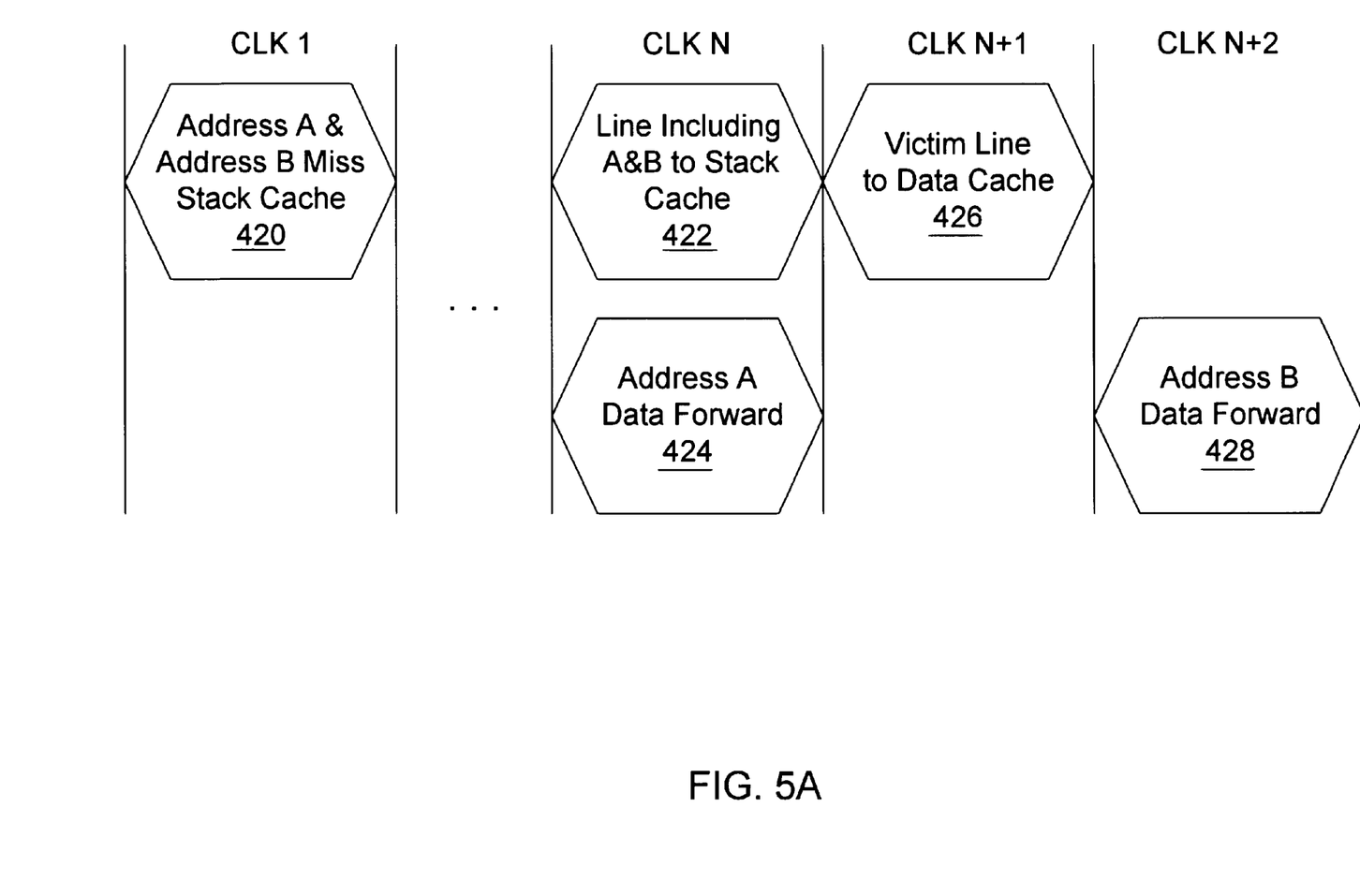
FIG. 5A is a timing diagram of data transfers between the stack cache and data cache according to one embodiment.

Turning now to FIG. 5A, a timing diagram of an exemplary data transfer between stack cache 226 and data cache 224 is shown according to one embodiment of microprocessor 200. The timing diagram shown in FIG. 5A is associated with embodiments of microprocessor 200 in which a cache line of data is transferred between stack cache 226 and data cache 224 during a single clock cycle. The clock cycles shown in FIG. 5A are separated by vertical lines, and are labeled CLK 1, CLK N, CLK N+1, and CLK N+2.

During CLK 1, a stack-relative memory access for an address A and for an address B are conveyed from decode units 208 and are detected to miss in stack cache 226 (as shown in block 420). In this example, addresses A and B lie within the same cache line. Because the memory accesses miss in stack cache 226, the memory accesses are transferred to load/store unit 222. A number of clock cycles later, during CLK N, the memory access for address A is selected by load/store unit 222 to access data cache 224. The cache line within which addresses A and B lie is transferred to stack cache 226 (block 422). Additionally, the data associated with address A is forwarded to reservation stations 210 if memory access A is a read memory access (block 424). Operations which may be dependent upon the stack-relative memory access thereby receive the data and may be executed.

During CLK N, stack cache 226 selects a victim line for replacement by the data being transferred from data cache 224. If the victim line has been modified while stored in stack cache 226, the line is stored into replacement buffer 404 and the victim copyback signal is asserted. During CLK N+1, the victim line is transferred to data cache 224 (block 426). Because the victim line is being transferred during CLK N+1, load/store unit 222 does not select any memory accesses for transmittal to data cache 224. Instead, address B is selected for transmittal during CLK N+2. The data associated with address B is forwarded during CLK N+2 (block 428). Because the cache line including address B is now stored in stack cache 226, the transfer from data cache 224 to stack cache 226 of the line containing address B is ignored by stack cache 226.

Figure 5B:
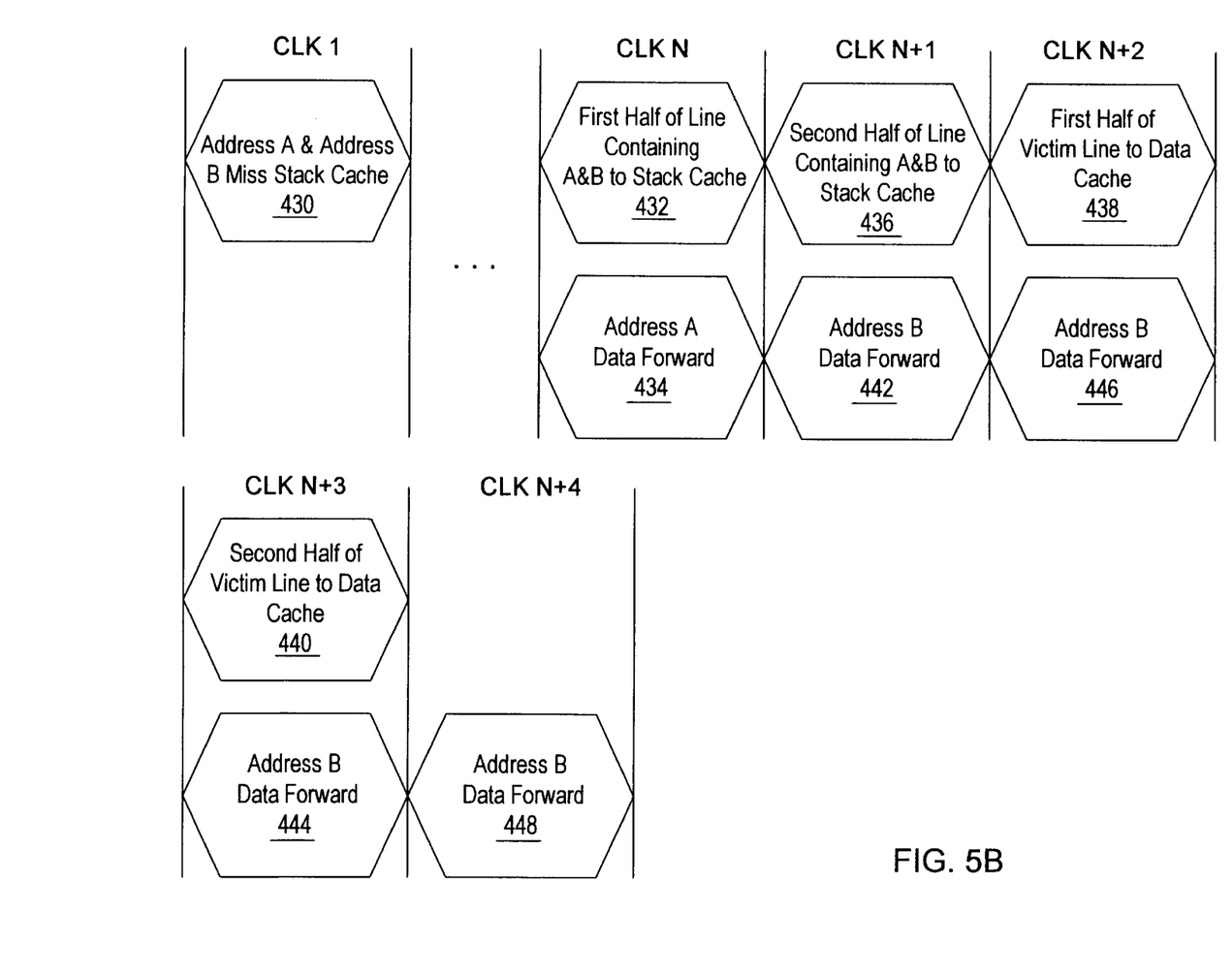
FIG. 5B is a timing diagram of data transfers between the stack cache and data cache according to another embodiment.

Turning now to FIG. 5B, a second timing diagram is shown of an exemplary data transfer between data cache 224 and stack cache 226 according to another embodiment of microprocessor 200. The timing diagram of FIG. 5B represents exemplary actions performed with respect to embodiments of microprocessor 200 in which multiple clock cycles are used to transfer a cache line of data between data cache 224 and stack cache 226. Similar to FIG. 5A, a pair of memory accesses to a cache line (addresses A and B) are performed to stack cache 226 during a clock cycle CLK 1 (block 430). Because the memory accesses miss stack cache 226, the memory accesses are transferred to load/store unit 222.

A number of clock cycles later, during CLK N, memory request A is selected by load/store unit 222 to access data cache 224 (block 432). In the embodiment of microprocessor 200 represented by the timing diagram shown in FIG. 5B, cache lines are transferred between stack cache 226 and data cache 224 in a pair of consecutive clock cycles. Therefore, a first half of the cache line containing address A is transferred to stack cache 226 during CLK N. The data associated with address A is also forwarded (block 434). Additionally during CLK N, stack cache 226 selects a victim line to replace within stack cache 226. The victim line is copied to replacement buffer 404. However, the victim copyback signal is not asserted during CLK N because CLK N+1 is used by load/store unit 222 and data cache 224 to transfer the second half of the cache line including address A (block 436). Instead, the victim copyback signal is asserted during CLK N+1 and CLK N+2. During CLK N+1 and N+2, the first and second halves of the victim line are transferred from stack cache 226 to data cache 224 (blocks 438 and 440).

If address B lies within the same half of the cache line in which address A lies, the memory access for address B may be performed to data cache 224 during CLK N+1 or CLK N+3 (blocks 442 and 444). Alternatively, if address B lies in the opposite half of the cache line as address A, then the memory access for address B may be performed during CLK N+2 (block 446). In yet another alternative, an embodiment of load/store unit 222 may not perform the memory access for address B until data transfers between data cache 224 and stack cache 226 are complete. Such an embodiment may perform the memory access for address B during CLK N+4 (block 448).

It is noted that other aspects regarding the implementation of linear addressed caches such as instruction cache 204, data cache 224, and stack cache 226 may be found within the commonly assigned, co-pending patent application entitled: "Linearly Addressable Microprocessor Cache", Ser. No. 08/146,381, filed Oct. 29, 1993 by Witt. The disclosure of this patent application is incorporated herein by reference in its entirety.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran. The disclosure of this patent application is incorporated herein by reference in its entirety.

It is additionally noted that other aspects regarding superscalar microprocessors may be found in the co-pending, commonly assigned patent application entitled "Superscalar Microprocessor Including a High Performance Instruction Alignment Unit", Ser. No. 08/377,843, filed Jan. 25, 1995 by Witt, et al. The disclosure of this patent application is incorporated herein by reference in its entirety.

It is still further noted that additional information regarding stack caches may be found in the co-pending, commonly assigned patent applications entitled: "A Dependency Checking Structure for a Pair of Caches Which are Accessed from Different Pipeline Stages of an Instruction Processing Pipeline" by Pflum; "A Microprocessor Configured to Swap Operands in Order to Minimize Dependency Checking Logic" by Tran; and "A Reorder Buffer Configured to Detect Dependencies Between Accesses to a Pair of Caches" by Tran. The aforementioned patent applications are filed concurrently herewith and are incorporated herein by reference in their entirety.

An exemplary listing of fast path instructions for embodiments of microprocessor 200 employing the x86 microprocessor architecture is given as table 3 below:

TABLE 3

Fast Path Listing

| x86 Assembly | Fast Path/MROM |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | fast path |
| IN | MROM |
| INC | fast path |
| INS | MROM |
| INSB | MROM |
| INSW | MROM |

TABLE 3-continued

Fast Path Listing

| x86 Assembly | Fast Path/MROM |
|---|---|
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | fast path |
| JECXZ | fast path |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | fast path |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | fast path |
| LOOPcond | MROM |
| LSL | MROM |
| LTR | MROM |
| MOV | fast path |
| MOVCC | fast path |
| MOV CR | MROM |
| MOV DR | MROM |
| MOVS | MROM |
| MOVSB | MROM |
| MOVSW | MROM |
| MOVSD | MROM |
| MOVSX | fast path |
| MOVZX | fast path |
| MUL | fast path |
| NEG | fast path |
| NOP | not sent to functional unit |
| NOT | fast path |
| OR | fast path |
| OUT | MROM |
| OUTS | MROM |
| OUTSB | MROM |
| OUTSW | MROM |
| OUTSD | MROM |
| POP | fast path |
| POPA | MROM |
| POPAD | MROM |
| POPF | MROM |
| POPFD | MROM |
| PUSH | fast path |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | fast path |
| RSM | MROM |
| SAHF | fast path |

TABLE 3-continued

Fast Path Listing

| x86 Assembly | Fast Path/MROM |
|---|---|
| SAL | fast path |
| SAR | fast path |
| SHL | fast path |
| SHR | fast path |
| SBB | fast path |
| SCAS | MROM |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

In accordance with the above disclosure, a method and apparatus for performing data transfers between a pair of caches has been described. Advantageously, misses to the first of the pair of caches do not stall the pipeline until the data is returned. Instead, these memory accesses are conveyed to the second of the pair of caches and data is provided from the second cache. Simultaneously, data is returned to the first cache for storing. Advantageously, subsequent accesses may hit in the first of the pair of caches. By sharing the same cache port upon the second cache between data transfers to and from the first cache and memory accesses to the second cache, the silicon area used to implement the second cache may be reduced.

Numerous variations and modifications will become apparent to those skilled in the art once the above disclosure is fully appreciated. It is intended that the following claims be interpreted to embrace all such variations and modifications.

What is claimed is:

1. A method for transferring data between a pair of caches configured to be accessed at different stages of an instruction processing pipeline, comprising:

determining that a memory access is a miss within a first one of said pair of caches during a decode stage of said instruction processing pipeline;

determining that said memory access is a hit within a second one of said pair of caches during an execute stage of said instruction processing pipeline; and transferring said data to said first one of said pair of caches concurrently with said determining that said memory access is a hit within said second one of said pair of caches.

2. The method as recited in claim 1 further comprising selecting a victim line from said first one of said pair of caches.

3. The method as recited in claim 2 further comprising transferring said victim line to said second one of said pair of caches if said victim line was updated while stored within said first one of said pair of caches.

4. The method as recited in claim 3 wherein said transferring of said victim line is performed during multiple clock cycles, wherein a portion of said victim line is transferred during each of said multiple clock cycles.

5. The method as recited in claim 3 wherein said transferring of said victim line is performed during a clock cycle subsequent to said selecting.

6. The method as recited in claim 3 wherein said transferring of said victim line is performed during a clock cycle immediately subsequent to said selecting.

7. The method as recited in claim 1 further comprising storing data associated with said memory access within said first one of said pair of caches.

8. The method as recited in claim 7 wherein said data associated with said memory access is transferred to said first one of said pair of caches in portions.

9. The method as recited in claim 7 wherein said data transferred to said first one of said pair of caches includes a plurality of bytes comprising a cache line including said data associated with said memory access.

10. The method as recited in claim 9 further comprising determining that a second memory access within said cache line is a miss within said first one of said pair of caches prior to said storing.

11. The method as recited in claim 10 further comprising determining that said second memory access is a hit within said second one of said pair of caches.

12. The method as recited in claim 11 further comprising transferring second data associated with said second memory access to said first one of said pair of caches.

13. The method as recited in claim 12 further comprising ignoring said transfer of said second data, such that said second data is not stored within said first one of said pair of caches.

14. A microprocessor comprising:
 a data cache configured to store data associated with stack-relative and non-stack relative memory accesses;
 a stack cache configured to store data associated with said stack-relative memory accesses, wherein said stack cache is coupled to said data cache to receive data associated with said stack-relative memory accesses, and wherein said data cache is configured to convey data associated with a particular stack-relative memory access to said stack cache concurrent with determining that said particular stack-relative memory access is a hit in said data cache;
 a load/store unit coupled to said stack cache and said data cache, wherein said load/store unit is configured to convey said stack-relative and non-stack-relative memory accesses to said stack cache and to said data cache; and
 a plurality of decode units coupled to said stack cache, wherein said plurality of decode units are configured to decode instructions to thereby detect said stack-relative memory accesses specified by said instructions and to convey said stack-relative memory accesses to said stack cache.

15. The microprocessor as recited in claim 14 wherein said load/store unit comprises a control unit, said control unit configured to convey said particular stack-relative memory access to said data cache.

16. The microprocessor as recited in claim 15 wherein said data cache is configured to convey a cache line including data associated with said particular stack-relative memory access to said stack cache.

17. The microprocessor as recited in claim 16 wherein said data cache is configured to convey said cache line during a single clock cycle.

18. The microprocessor as recited in claim 16 wherein said data cache is configured to convey said cache line during a plurality of clock cycles.

19. The microprocessor as recited in claim 16 wherein said data cache is configured to convey said cache line during a plurality of consecutive clock cycles.

20. The microprocessor as recited in claim 14 wherein said stack cache comprises a replacement buffer for storing a victim line.

21. The microprocessor as recited in claim 20 wherein said stack cache further comprises a control unit coupled to said replacement buffer, wherein said control unit is configured to select said victim line from said stack cache.

22. The microprocessor as recited in claim 21 wherein said control unit is further configured to convey said victim line to said data cache during a clock cycle subsequent to said selection of said victim line.

23. The microprocessor as recited in claim 21, wherein said control unit is configured to select said victim line responsive to said load/store unit conveying said particular stack-relative memory access to said data cache.

24. The microprocessor as recited in claim 14 further comprising an instruction alignment unit coupled, to said plurality of decode units, wherein said instruction alignment unit is configured to align instructions to said plurality of decode units.

25. The microprocessor as recited in claim 24 further comprising a plurality of reservation stations configured to store instructions prior to execution of the instructions, wherein each one of said plurality of reservations stations is coupled to a respective one of said plurality of decode units.

26. The microprocessor as recited in claim 14 wherein said plurality of decode units are coupled to said load/store unit, and wherein said plurality of decode units are configured to provide said non-stack-relative memory accesses to said load/store unit, and wherein said plurality of decode units are configured to provide said stack-relative memory accesses to said load/store unit if said stack-relative memory accesses miss in said stack cache.

27. The microprocessor as recited in claim 26 wherein said plurality of decode units are further configured to inhibit providing one of said stack-relative memory accesses to said load/store unit if said one of said stack-relative memory accesses hits in said stack cache.

* * * * *